E. P. ALEXANDER.
THERMOSTAT.
APPLICATION FILED MAR. 31, 1910.
1,030,857.
Patented July 2, 1912.
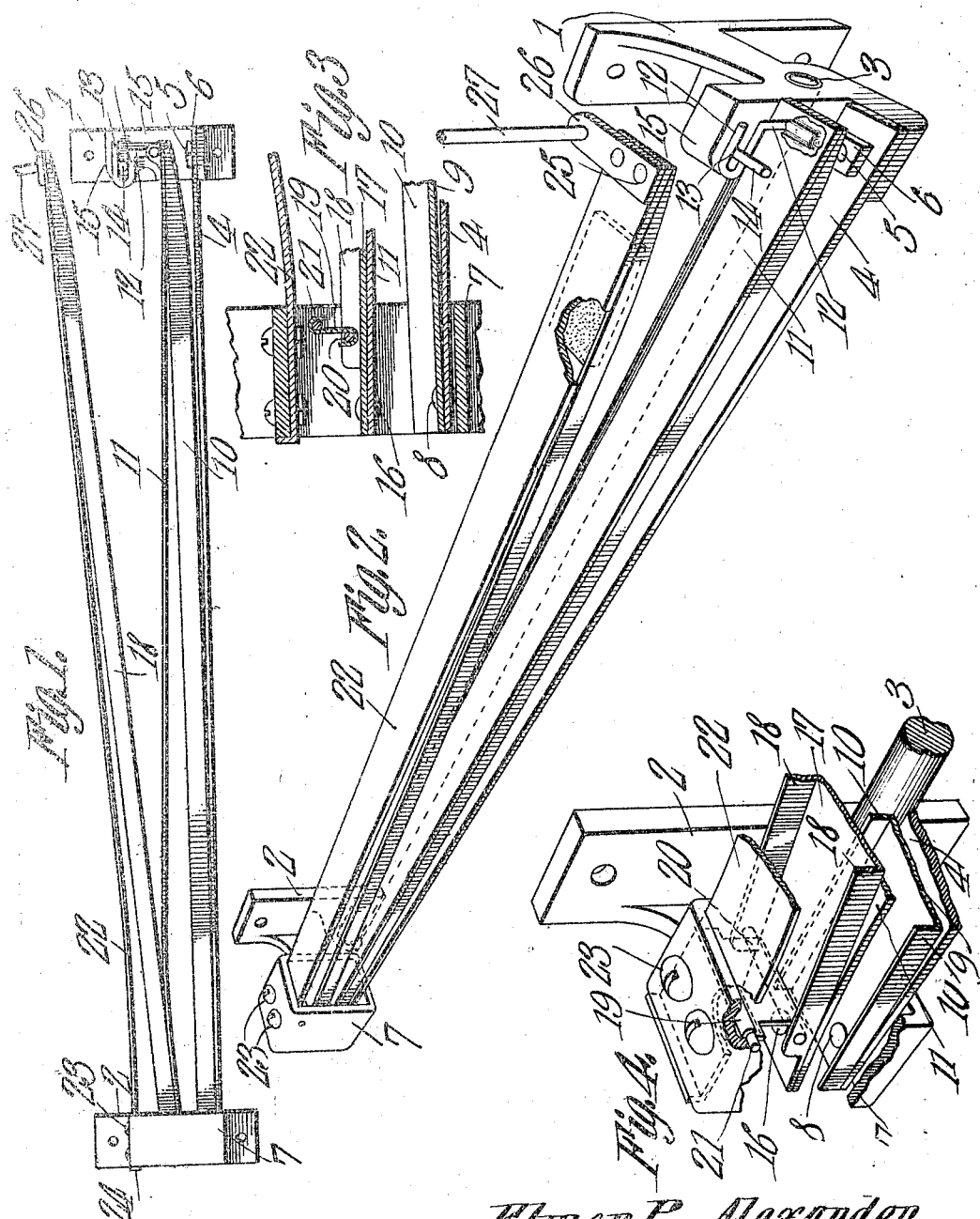
Witnesses
Elmer P. Alexander
Inventor
by
Attorneys

UNITED STATES PATENT OFFICE.

ELMER P. ALEXANDER, OF LEWISTOWN, PENNSYLVANIA.

THERMOSTAT.

1,030,857.

Specification of Letters Patent.   Patented July 2, 1912.

Application filed March 31, 1910.   Serial No. 552,613.

*To all whom it may concern:*

Be it known that I, ELMER P. ALEXANDER, a citizen of the United States, residing at Lewistown, in the county of Mifflin and State of Pennsylvania, have invented a new and useful Thermostat, of which the following is a specification.

This invention relates to thermostats of the kind which employ metals of different coefficients of expansion.

The difficulty with thermostats as heretofore constructed is that they are sluggish and limited in their movements, and consequently, require considerable changes in temperature to affect them, and when they do act, they usually are not able to produce enough movement to perform many practical operations. Where a thermostat is operating under conditions wherein the temperature is subject to very great changes, its lack of delicacy is not so noticeable, and old forms of thermostats might give a certain degree of satisfaction. For example, a thermostat mounted in proximity to a gas flame, for the purpose of shutting off the gas in case of accidental extinction of the flame, might work to a certain extent on account of the vast resulting change in temperature. But a thermostat in order to be of practical value must be able to do more than register the difference between the temperature of a gas or furnace flame and the ordinary atmosphere. It must be delicately responsive to the slightest changes in temperature. This is particularly the case where a thermostat is employed as a means of maintaining a uniform temperature in an incubator, hospital, residence or the like. If a thermostat is to be of value under the last named conditions it must respond to very slight changes in temperature and must act to an extent sufficient to restore the temperature, through suitable controlling mechanism, to its normal condition. Old forms of thermostats are inadequate for these purposes. They not only permit wide variations in temperature before acting, but when they do respond their movements are too slight to be of much use. In the case of an incubator, if it is possible for the temperature to rise or drop five or ten degrees before the thermostat is influenced, and if the thermostat then moves the valve so slightly that a comparatively long period of time elapses before the normal temperature is restored, it will be apparent that neither the thermostat nor the incubator are of much practical value. In fact, it may be conservatively stated that incubators under usual conditions are almost worthless on account of defective thermostats.

The principal object of the present invention is to provide a thermostat which is delicately responsive to slight changes in temperature; which has a sufficiently large field of movement for practical purposes; and which is adapted if desired to supplement the action of expansive metal, with the force of gravity, and the principle of leverage.

With the foregoing and other objects in view which will appear as the description proceeds, the invention resides in any form of thermostat which embodies the principles of invention exemplified in the accompanying drawing and following specification, and included within the scope of the appended claims, it being understood that the precise embodiment of invention herein disclosed is merely one example of the invention and that the same may be embodied in many other ways within the scope of the claims.

In the accompanying drawings forming part of this specification:—Figure 1 is a side elevation of a thermostat constructed in accordance with the invention. Fig. 2 is a perspective view thereof. Fig. 3 is a sectional view through the left hand end of Fig. 1. Fig. 4 is a perspective view of the same end.

Like reference numerals indicate corresponding parts in the different figures of the drawing.

The embodiment of invention herein disclosed comprises a suitable frame made up of the brackets 1 and 2 connected with each other in any desired manner such as by means of the bar or member 3.

The numeral 4 indicates a strip of metal of a high coefficient of expansion, which will be referred to herein as an expander. The expander 4 is connected with or anchored on the bracket 1 by means such as the bolt 5 and nut 6. The opposite end of the expander 4 is free and rests lightly upon the bottom of the square head 7 of the bracket 2. Riveted or otherwise secured to the free end of the expander 4 as indicated at 8, is a strip 9 formed of metal of a low coefficient of expansion, which will be referred to herein as a connector or cumulator. The connector 9 extends in zig-zag relation to the expander 4 and preferably lies above the same and almost in parallelism therewith as shown. The connector 9 preferably is provided with upstanding side flanges 10—10, so as to be channel shaped in cross section, the flanges 10—10 serving to stiffen the connector. At its upper end, above the anchored end of the expander 4, the connector 9 is connected in any suitable manner with the lower end of another expander 11, the connected ends of the connector 9 and the expander 11 being slidably supported in any suitable manner by means such as the traveler hook 12 having the elongated parallel portions 13—13 which embrace opposite sides of a pin 14 set into the head 15 of the bracket 1. The hook portions 13—13 and pin 14 permit sliding movement of the members 9—11 and prevent up and down movements thereof. At its upper end the expander 11 is riveted or otherwise secured at 16 to an oppositely extending connector 17 having stiffening flanges 18. The connected ends of the expander 11 and connector 17 are movably supported in any suitable manner such as by means of the hanger or hook 19 which is engaged at its lower end with a transverse pin 20 mounted in the flanges 18 of the connector 17 and at its upper end, is engaged with a pin 21 fixed in the head 7 of the bracket 2. The upper end of the connector or cumulator 17 is fixed to the free end of an expander 22 which is anchored on the head 7 in any suitable manner such as by means of the screws 23—23. The anchored end of the expander 22 may be formed if desired with an upstanding flange 24. The means for connecting the ends of the connector or cumulator 17 and expander 22 may consist of the rivets 25 which also serve to secure in position an arm 26 to which is secured a rod 27 or other means for utilizing the action of the thermostat for performing useful operations such, by way of example, as the operation of controlling an incubator valve or the like.

Constructed as described, the operation of the device is substantially as follows: Upon a rise in temperature, the expanders 2 and 11 expand to the left in Fig. 1. The connector 9 cumulates this expansion so that the upper end of the expander 11 moves the lower end of the connector 17 a distance equal to the sum of the expansion of the two expanders 4 and 11. At the same time, the upper expander 22 is expanding in the opposite direction, with the result that the arm 26 and rod 27 are moved to a marked degree. This downward movement of the active end of the expander 22 is accelerated by the force of gravity and a strong leverage action. The anchored end of expander 22, which as will now be apparent is not only an expander but also a transformer for transforming the expansion of the device into swinging movement which is enormously multiplied with reference to the expansion, acts as a fulcrum of a lever. Moreover, as the lower end of the connector 17 is disposed close under the anchored end of the expander 22, the slightest movement of the lower end of the connector 17 to the left causes an enormously multiplied downward movement of the end of the combined expander and transformer 22, which movement is accelerated by gravity action. If the proportions of the parts are arranged approximately as shown in the drawing, movement on the lower end of the connector 17 is multiplied approximately 24 times at the free end of the transformer 22. In addition to the action of the expanders 4 and 11 acting to the left, the expander 22 acting to the right, increases the resulting movement.

It is found in practice that a thermostat constructed in accordance with the principles of this invention reacts to a variation of one-quarter of a degree Fahrenheit. In other words an incubator or other device or room or building, equipped with the thermostat means of the present invention can be maintained constantly at a temperature which will not vary more than a quarter of a degree Fahrenheit above or below normal. In the case of an incubator, the economy which is effected, not only by preventing destruction of the fertilizing properties of the eggs by violent fluctuations in temperature, but also by regulating the quantity of oil or other fuel necessary for heating the incubator, renders the thermostat of the present invention an extremely valuable adjunct to incubators.

An analysis of the device as illustrated in the drawing, shows that each pair of expanders and connectors, such, for example, as 22 and 17 form in effect an open base triangle, the expander forming one long side of the triangle, the connector the other, and the space between the separated ends thereof forming the open base. The action of the members 22 and 17 is practically the same as that of an elongated triangular structure pivoted at one of its basal corners, so that relative movement of the other corner causes a greatly multiplied movement of the elongated end or apex of the triangle. In addition to the open base triangle formed by the members 22 and 17, another triangle is formed by the members 17' and 11, the second triangle having its apex extending in an opposite direction to that of the first mentioned triangle; and so on, throughout the alternate and zig-zag arrangement of expanders and connectors or cumulators.

It is found in practice that very little, if any friction is produced on the hanger 12 and pin 14. On the contrary the hanger seems to be balanced by the other parts of the thermostat and vibrates slightly like a balanced scale beam on the pin 14.

The thermostat of the present invention secures practically all the effects of metallic expansion and converts them into useful and multiplied action. There is no lost motion or stress and strain of metal as is the case where the metals of high and low coefficients of expansion are secured together throughout all or the greater part of their length; instead of being secured merely at their ends and free throughout the remainder of their lengths as in the present invention.

By reacting to a change of one quarter degree Fahrenheit and by moving its transformer to a greatly multiplied extent so as to perform useful operations, the thermostat of the present invention constitutes an important advance in thermal arts and devices, and practically overcomes the defects and objections heretofore interfering with the proper operation and commercial value of incubators.

What is claimed is:

1. A thermostat having a plurality of expanders one expander being anchored at one end and the other at its opposite end, connecting means secured at one end to the free end of one expander and at the other end to the free end of the other expander, the free end of each expander being near the anchored end of the other expander, and means operated by said expanders for exerting thermostatic power.

2. A thermostat having a plurality of expanders, one anchored at one end and the other anchored at the other end, a connector secured at one end to one expander and at the other end to the other expander, said expanders and connector being arranged in zig-zag relation to each other, and means connected with the free end of one expander for exerting thermostatic power.

3. A thermostat having a plurality of expanders substantially parallel and abreast of each other, one of said expanders being anchored at one end and the other of said expanders being anchored at the other end, the free end of each expander being disposed opposite the anchored end of the other expander, a diagonally extending connector rigidly secured to one end of one expander and connected at its other end with the free end of the other expander, and means connected with said expanders for exerting thermostatic power.

4. A thermostat having a plurality of expanders, one of the expanders being anchored at one end and the other of said expanders being anchored at the other end, each expander having a free end disposed adjacent the anchored end of the other expander, a plurality of diagonally extending connecting means located between said expanders and connected with the free ends thereof, and means operated by said expanders for exerting thermostatic power.

5. A thermostat having a transformer consisting of a flexible metal strip constituting an expander, each strip being anchored at one end, the other end of said strip being adapted to fall by gravity, a second strip secured to the free end of said first mentioned strip and arranged in approximately V-shaped relation thereto, the end of said second strip adjacent the anchored end of the first strip being free from said first strip, an expander independent of the first mentioned expander for moving the lower end of said last mentioned strip, and means operated by the expanders for transmitting power.

6. A thermostat having a pair of oppositely extending expanders, one of the expanders being anchored at one end and the other of said expanders being anchored at the opposite end, the free end of each expander being located adjacent the anchored end of the other expander, a connector secured at one end to the one expander and at the other end to the other expander, said connector and expanders being arranged to form two oppositely extending open-base triangles, and means connected with said expanders for exerting thermostatic power.

7. A thermostat having a plurality of metals of high and low coefficients of expansion, the metals of high coefficients being arranged alternately with those of low coefficients, the metal at one end of the series of metals being anchored at one end and the metal at the other end of said series being anchored at the other end, the free end of one end metal being connected with the free end of the other end metal by means of the intervening metals being placed in zig-zag relation, and means operated by said metals for exerting thermostatic power.

8. A thermostat comprising a series of metallic strips of different coefficients of expansion, each strip being connected at one end to the strip on one side thereof, and at its opposite end to the strip on the other side thereof, whereby to produce a plurality of oppositely extending V-shaped structures, the strip at one end of said series being anchored at one end and the strip at the other end of said series being anchored at the opposite end, and means operated by said strips for exerting thermostatic power.

9. A thermostat having cumulating means consisting of a plurality of expanders arranged substantially abreast of each other, one of said expanders being anchored at one end and the other of said expanders being anchored at the opposite end, the free end of one expander being disposed opposite the anchored end of the other expander, an intermediate expander, a plurality of strips of metal of a low coefficient of expansion, each of said strips connecting the free end of one of said anchored expanders with the opposite end of said intermediate expander, and means operated by said expanders for exerting thermostatic power.

10. A thermostat having two expanders arranged substantially abreast of each other and being free to expand independently of each other, and an intermediate non-expander attached at one end to one end of one expander and at its other end to the opposite end of the other expander, said non-expander being free from the expanders except at its ends and said expanders being free from each other except through the connection of said non-expander, whereby the longitudinal expansion of said expanders is cumulated, and power transmission means operated by said expanders.

11. A thermostat comprising an upper expander anchored at one end, a lower expander anchored at the other end, an intermediate expander, a connector secured at one end to the free end of the upper expander and at the other end to one end of the intermediate expander, and a second connector secured at one end to the intermediate expander and at the other end to the lower expander and means operated by said expanders for exerting thermostatic power.

12. A thermostat comprising a frame, an upper expander secured at one end to the frame, a lower expander secured at the other end to the frame, an intermediate expander, an upper connector secured at one end to the upper expander and at the opposite end to the intermediate expander, and a lower connector secured at one end to the lower expander and at the other end to the intermediate expander, the point of connection between the upper expander and the upper connector being used as a transformer and means operated by said expanders for exerting thermostatic power.

13. A thermostat comprising an upper expander anchored at one end, a lower expander anchored at the other end, an intermediate expander, a lower connector secured at one end to the free end of said lower expander and at the other end to the intermediate expander, an upper connector secured at one end to the upper expander and at the other end to the intermediate expander, a sliding support for the point of connection between the lower connector and the intermediate expander, a movable support for the point of connection of the intermediate expander and the upper connector, and means operated by said expanders for exerting thermostatic power.

14. A thermostat comprising a frame, an upper expander consisting of a strip of metal of a high coefficient of expansion, said upper expander being secured at one end to said frame, a lower expander formed of a thin strip of metal of a high coefficient of expansion, a connector formed of a metal of a low coefficient of expansion secured to one end of said lower expander and at the other end to said intermediate expander, an upper connector formed of a strip of metal of a low coefficient of expansion secured at one end to said upper expander and at the other end to said intermediate expander, and means operated by said expanders for exerting thermostatic power.

15. A thermostat comprising a pair of brackets spaced apart and rigidly connected with each other, a lower expander anchored on one of said brackets resting loosely at its opposite end on the other of said brackets, an upper expander secured at one end to said other bracket and projecting at its free end above said first mentioned bracket, means on the free end of the upper expander for operating a valve, an intermediate expander, a lower connector secured at its lower end to the free end of said lower expander and at its opposite end to said intermediate expander, an upper connector secured at its lower end to said intermediate expander and at its upper end to the free end of said upper expander, sliding supports for both ends of said intermediate expander, means for transmitting power from the connected ends of said upper expander and said upper connector, and means for stiffening said connectors.

In testimony that I claim the foregoing as my own, I have hereto affixed my signature in the presence of two witnesses.

ELMER P. ALEXANDER.

Witnesses:
 LEWIS H. RUBLE,
 JOHN A. DAVIDRIGER.